United States Patent [19]
Liu

[11] 3,780,674

[45] Dec. 25, 1973

[54] LIQUID INCINERATOR

[75] Inventor: Han Liu, Wellsville, N.Y.

[73] Assignee: The Air Preheater Company, Inc., Wellsville, N.Y.

[22] Filed: Feb. 11, 1972

[21] Appl. No.: 225,472

[52] U.S. Cl. .................... 110/8 R, 110/8 C, 110/17
[51] Int. Cl. ............................................. F23g 5/12
[58] Field of Search ....................... 110/7, 8, 12, 17

[56] References Cited
UNITED STATES PATENTS

| 1,877,214 | 9/1932 | Woodman | 110/17 X |
| 3,388,679 | 6/1968 | Pantaja | 110/17 X |
| 1,995,893 | 3/1935 | McEver | 110/17 |
| 3,330,230 | 7/1967 | Sasaki | 110/17 |
| 3,408,968 | 11/1968 | Pantoja | 110/17 |

Primary Examiner—Kenneth W. Sprague
Attorney—Wayne H. Lang et al.

[57] ABSTRACT

A waste incinerator for burning a variety of sludges, liquids and solid materials that can be reduced to a combustible liquid by exposure to heat. Such materials are fed into an incinerator and fall onto the uppermost of several superposed perforate beds. As the waste material is exposed to heat it becomes less viscous and slowly drips through the perforations of each bed to a subjacent bed where it is exposed to additional heat and ultimately gasified and burned.

4 Claims, 1 Drawing Figure

PATENTED DEC 25 1973
3,780,674
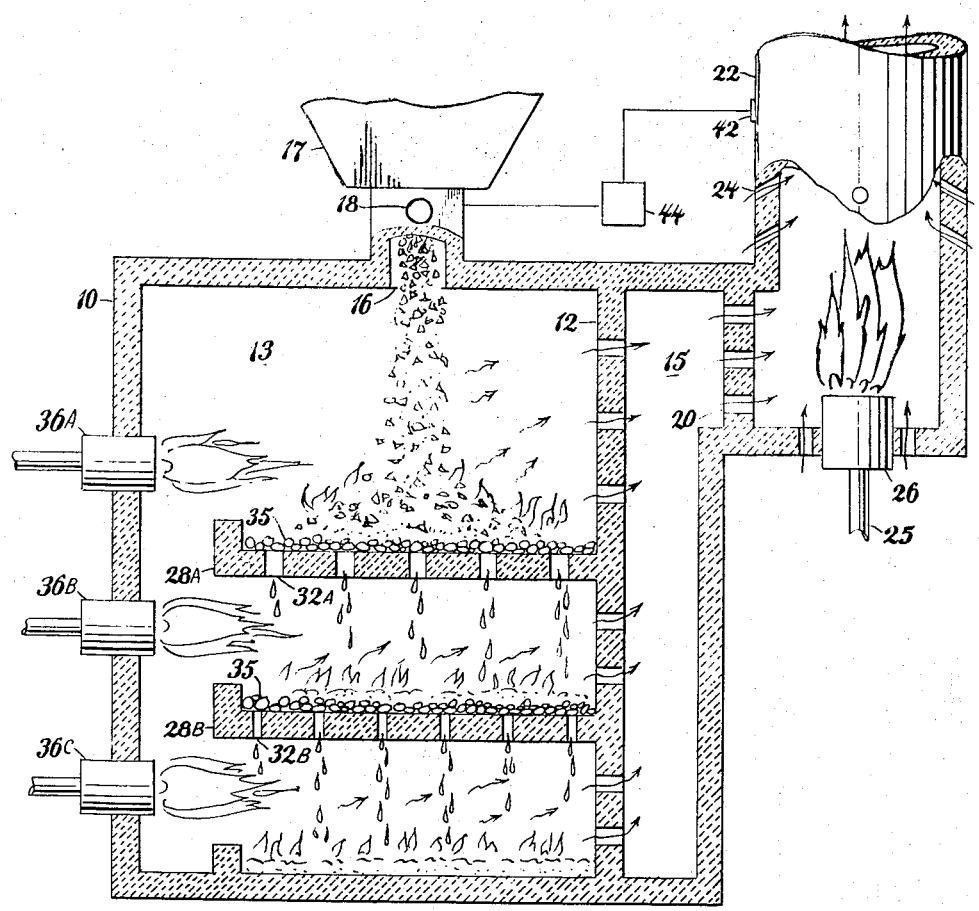

LIQUID INCINERATOR

BACKGROUND OF THE INVENTION

1. Field of the Invention

The present invention relates to the incineration of waste material. More particularly, the present invention relates to a novel apparatus that provides for the complete incineration of liquid waste and sludge including the vapors and fumes emitted therefrom.

2. Description of Prior Art

As is well known, numerous incinerators have been developed which generate gases during the pyrolosis of solid combustible material, and the burning of such gases exhausting therefrom is regularly done in a way that is well known in the art. Still, the burning of liquid wastes such as oil, sludge, plastic or polymers that melt when exposed to heat have continued to cause many problems with the result that their combustion is frequently accompanied by excessive amounts of incompletely burned gas, smoke and other vapors. Accordingly, patents represented by U.S. Pat. Nos.: 3,490,395; 3,495,555; 3,559,596 and 3,572,265 have been developed to burn such materials in a liquid form. However, even though air being used for combustion in main or auxiliary heating means is regulated in accordance with the type and quantity of waste being burned, the melting of the material will necessarily produce a phase change which will suddenly release an excessive amount of fuel for combustion. As a result, incineration will be incomplete, slow, and excessive smoke and fumes will be periodically given off during the incineration process.

In the prior art devices combustion air and auxiliary heat were frequently regulated in accordance with the type of waste being incinerated, the desirable incineration temperature and the charging rate of the waste. While such an arrangement was frequently effective, excessive amounts of melted solid waste, sludge type waste and combustible semiliquid waste of high viscosity would tend to collect as a pool at the bottom of the incineration chamber. This pool of semi-liquid or liquid waste on the hearth of the incinerator would possess limited surface areas which might be exposed to the heat, and since the volatilization rate of the liquid waste could occur only at the surface of the pool, the burning rate would be retarded. When the chamber refractory material would reach a temperature level at which the liquid boils, the vigorous pool boiling could, in a very short time, release an enormous amount of volatiles and/or vapors that would exceed the limit of the capacity of the incinerator. In many cases, the rate of smoke and/or fume generation from pool boiling can be so high that the response of the incinerator is not fast enough to cope with. Hence, incineration will be incomplete and excessive particle emission will result from the incineration process.

It therefore follows that more effective incineration of such waste can be assured if such waste were not allowed to collect at the bottom of the incinerator but were repeatedly broken up into small droplets and subjected to an environment sufficient for complete gasification and incineration at a uniform rate compatible to the incinerator control.

SUMMARY OF THE INVENTION

In accordance with the present invention, a liquid or meltable solid is fed into the incinerator. After the solid has been reduced to a liquid it is allowed to fall through perforations in a series of vertically spaced beds or grids. The liquid of the melted waste forms droplets which flow downward over one grid and then fall to a subjacent grid. Since spheres have the maximum surface area for a given volume, the droplets will volatilize at a rage proportional to the surface area that is exposed to the high temperature environment.

More particularly, waste from a supply hopper falls on to the top grid of a primary combustion chamber. The waste is subjected to an initial quantity of heat where it is reduced to liquid and partially vaporized. Some of the gaseous vapors are forthwith mixed with oxygen and ignited to provide an immediate partial combustion, while the unburned fumes are moved laterally to a secondary chamber where they in turn flow to an afterburner. The liquid waste remaining in the primary combustion chamber runs down through the apertures of the top grid and then drips to a subjacent grid where it is again subjected to combustion and the same process is repeated. The perforate beds which may each be provided with a packed bed of refractory material that retains heat and increases the resident time of the liquid waste as it falls through the incinerator.

The several perforate beds or grids with suitable burners therebetween and with the necessary air supplies effect complete vaporization of the waste before it reaches the bottom of the incinerator.

After vapors and fumes are produced in the primary combustion chamber they move laterally through a perforate baffle into a second combustion chamber opening into an outlet stack having a suitable afterburner.

A general objective of my invention is therefore to provide an incinerator that effectively vaporizes liquids and sludges to permit their complete incineration.

A more specific objective of the invention is to provide an arrangement that provides for a variation in the residence time a liquid waste material is in an incinerator so as to effect its complete vaporization and incineration.

BRIEF DESCRIPTION OF THE DRAWING

The present invention may be better understood and its numerous advantages will become more apparent to those skilled in the art by reference to the accompanying drawing in which the single FIGURE is a schematic side elevation in section of an incinerator involving this invention.

DESCRIPTION OF THE PREFERRED EMBODIMENT

Referring to the single FIGURE of the drawing, the numeral 10 refers to a housing for the incinerator of liquids or meltable waste materials. The housing is provided with a vertical perforate baffle 12 that divides it into primary and secondary combustion chambers 13 and 15. A loading inlet 16 has a hopper 17 for waste material including a control valve 18 for regulating the amount or rate of waste material admitted to the primary combustion chamber. An outlet port 20 with an exhaust stack 22 depending therefrom is provided at the top of the secondary combustion chamber whereby exhaust gases may be exhausted from the incinerator.

At the lower end of the stack 22 are one or more air supply ducts 24 leading to an afterburner having an independent supply of fuel 25 whereby the gases exhausting from chamber 13 will be subjected to the heat of combustion in the afterburner.

In accordance with the present invention, I provide a series of perforate plates or grids 28 in the primary chamber 13 immediately subjacent the loading opening 16 of the housing 10. The grids are formed of ceramic or other temperature resistant material and include a multiplicity of perforations of decreasing size whereby the top grid 28-A has the largest perforations 32-A and subjacent grids have successively smaller perforations 32-B that provide increasingly greater resistance to fluid passing therethrough. A bed of refractory material 35 may also be carried on each of the several grids to provide increased contacting surface for the liquid waste material. The number of superposed grids is variable and may be determined by the quantity and type of waste material to be disposed.

Each perforate grid is preferably secured to a side of the perforate baffle 12 whereby vapors given off from combustion of the liquid waste as it drips from one tray to another will be carried transversely through the perforate baffle into chamber 15 and thence to the afterburner in the outlet stack.

A burner 36 having an independent source of fuel and air connected thereto is disposed adjacent the upper surface of each grid and is adapted to exhaust laterally across the upper surface thereof to subject liquid waste flowing over each perforate bed and that dripping from one grid to another to heat from the burner exhaust. The burner exhaust also comes in contact with the refractory objects carried upon each bed whereby they will assume a high temperature incandescence or glow that will effectively assist in vaporizing the liquid waste falling on them from above.

Thus, the liquid waste will be repeatedly subjected to the heat of combustion after its introduction into the incinerator chamber 13 from the loading means 17 by the action of the burners 36-A, 36-B and 36-C. Moreover, the temperature at the several grids 28-A, 28-B or 28-C will increase progressively from the topmost grid 28-A to 28-B or 28-C.

This temperature gradation within chamber 13 may be used to advantage in the incineration of waste oil and sludge from machine shop operations that may include metal shavings and other metal fragments. Such waste is admitted through the feeder 17 to the top grid 28-A. Heat from burner 36-A then partially reduces the oil to a vapor or a low viscosity fluid that flows over the packed bed of refractory material 35, through the perforations 32-A and drips to a subjacent grid 28-B. The metal fragments are held behind or filtered by the refractory objects 35 on the top grid. Inasmuch as low temperature waste is continuously being fed on to the top grid 28-A, the operating temperature there is lower than that at the other grids. By sizing the several burners accordingly, by regulating the rate of waste inlet at 18, and by maintaining the number of grids in accordance to the desired residence time, the temperature at the top grid may be maintained below that at which excessive oxidation of the metal shavings or other waste will occur.

Thus the oil waste is readily vaporized and incinerated, while the metal fragments or shavings are held back in an area having a temperature somewhat less than that necessary for rapid oxidation of the metal. A removable panel or "cleanout" door at the side of the unit (not shown) may be provided to permit occasional removal of the unburned metal fragments.

The waste material is fed into inlet 16 from a suitable supply hopper 17 at a rate that permits the complete volatilization of the liquid waste. Inasmuch as the temperature with the stack 22 is a prime indicator of the thoroughness of combustion, a thermocouple 42 operates a controller 44 which in turn regulates the control valve 18 to supply the waste material at a rate at which combustion is complete. Thus, as excessive amount of waste material being admitted to chamber 13 will result in excessive fumes and smoke in stack 22 and a lowering of temperature. A lowering in temperature in stack 22 will be noted by thermocouple 42 and will in turn be relayed to controller 44. Accordingly, the controller will call for a slowdown of control valve 18 whereby a decrease of fuel is being added to the incinerator.

While a single form of my device has been described it will be understood that the primary concept described herein may be applicable to other sizes and shapes of apparatus employed for the stated purpose. It is thus to be understood that various changes may be made in the details of construction without departing from the spirit of the invention.

I claim:

1. Apparatus for burning liquids, sludges, and solids that may be reduced to liquid form by the application of heat comprising a housing having an inlet opening for the charging of waste to be burned and an outlet opening for the exhaust of products of combustion therefrom, a plurality of perforate beds subjacent the inlet opening adapted to retain the combustible waste falling from the inlet opening, burner means laterally adjacent the upper surface of the perforate beds adapted to exhaust laterally to subject the liquid waste retained thereby to the heat of combustion, and a packed bed of refractory objects carried by the perforate beds of said apparatus that retain heat exhausting from the burner.

2. Apparatus for burning liquid waste and combustible material that may be reduced to liquid by the application of heat comprising a housing having a primary and a secondary combustion chamber in lateral juxtaposition, an inlet opening for charging waste material into the primary combustion chamber, an outlet opening for the exhaust of products of combustion from the secondary chamber, an exhaust stack connected to the outlet opening, an afterburner in the exhaust stack adapted to subject gases exhausting from the secondary chamber thereto, perforate baffle means lying vertically in said housing and adapted to separate the primary from the secondary combustion chambers, a plurality of spaced perforate beds lying horizontally in the primary chamber subjacent the loading opening, and burner means intermediate the perforate beds exhausting across the perforate beds and arranged to subject liquid waste falling from the inlet opening to the heat of combustion therefrom.

3. Apparatus for burning liquid waste as defined in claim 2 including feeding means that supplies waste material to the primary combustion chamber, a thermocouple in secondary combustion chamber, and means regulating the feeding means to the primary combustion chamber in response to the temperature detected by said thermocouple.

4. Apparatus for burning waste material as defined in claim 2 wherein horizontal perforate beds depend from the vertical baffle that separates the primary and secondary combustion chambers.

* * * * *